UNITED STATES PATENT OFFICE.

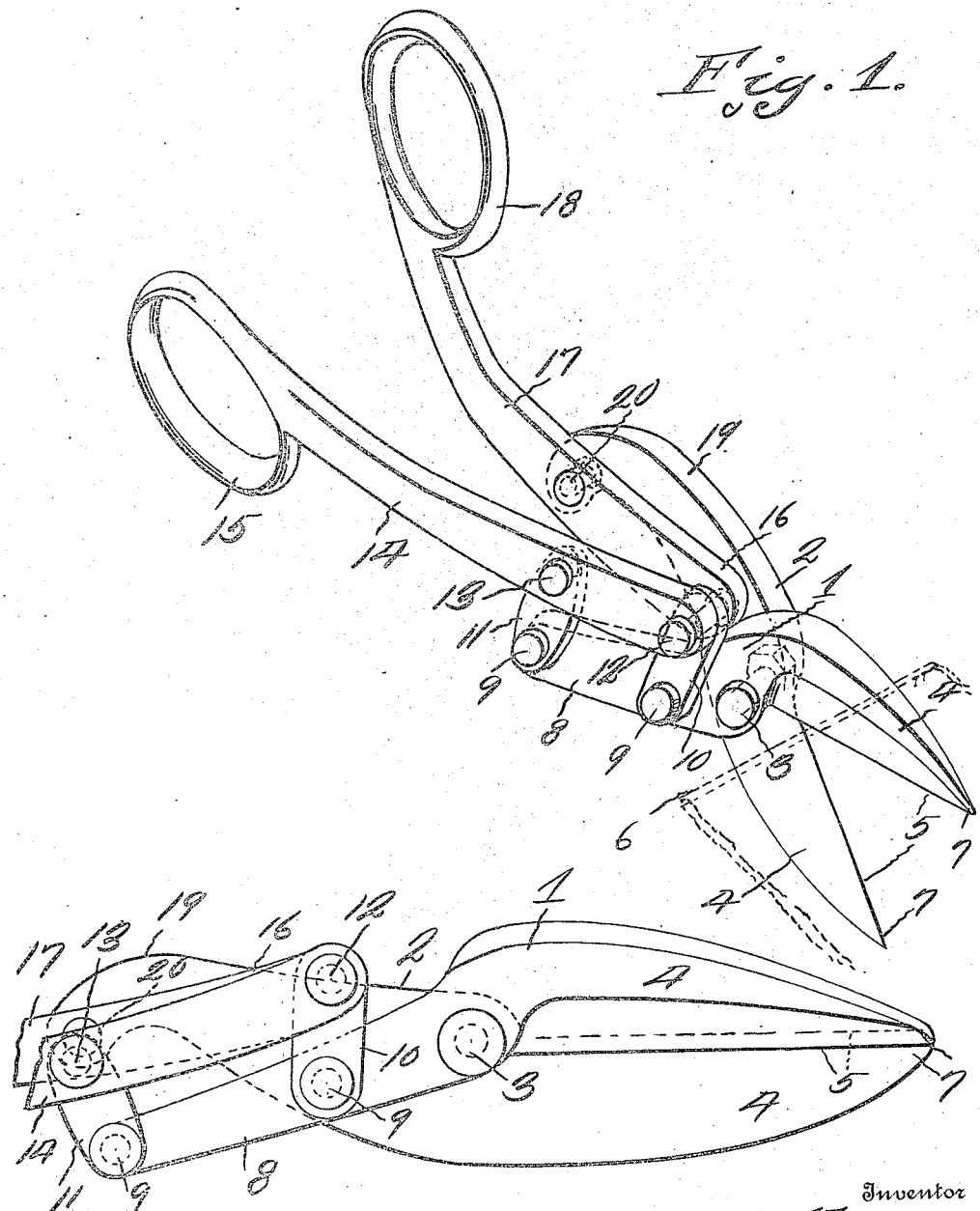

GEORGE W. KILLIN, OF WEST HUNTINGTON, WEST VIRGINIA.

SHEARS.

1,425,779.

Specification of Letters Patent. Patented Aug. 15, 1922.

Application filed July 29, 1921. Serial No. 488,317.

*To all whom it may concern:*

Be it known that I, GEORGE W. KILLIN, a citizen of the United States, residing at West Huntington, in the county of Cabell, State of West Virginia, have invented a new and useful Shears; and I do hereby declare the following to be a full, clear, and exact description of the invention, such as will enable others skilled in the art to which it appertains to make and use the same.

The invention relates to shears and has for its object to provide a pair of shears wherein the shearing leverage is increased in power and the shears so constructed that they will embody the advantages in the form of hand shears, the advantages of the more cumbersome bench shears and made a minimum size.

A further object is to provide a pair of shears wherein the cutting blades will simultaneously move during a cutting operation, thereby securing maximum efficiency of cutting, and at the same time obviating the common difficulty now found in hand and bench shears wherein one blade is stationary and the other blade moves, in which type of shears the knives have a tendency to force the material being severed towards the points of the knives thereby requiring greater power on account of the decreased leverage to sever the material. Also to provide a shearing blade actuating mechanism which is applicable to machine shears as well as bench and hand shears.

A further object is to provide shears which will open to full cutting capacity with less opening of the handles than any other shears on the market, straight or compound action. This feature also lessens a man's day's work, makes it easier on him in cutting heavy metal than is possible with any other shears.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the shears, showing the same in open position.

Figure 2 is an enlarged side elevation of the forward end of the shears showing the same in closed position.

Referring to the drawings, the numerals 1 and 2 designate crossed members which are pivotally connected together by means of a bolt 3. Members 1 and 2 terminate in their forward ends forwardly of the pivotal bolt 3 and cutting blades 4, which blades are of conventional type and have cutting edges 5, which edges when brought together move simultaneously, thereby shear into the edge of a piece of material 6 immediately upon starting of the closing action and hold the material against outward movement during the cutting operation, which is not the case where only one cutting blade moves as in the case of a conventional form of hand or bench shears, in which conventional form the material 6 has to be held with one hand or in some manner against movement, and if not held is forced towards the ends 7, thereby reducing the leverage and consequently necessitating a great deal more power for the shearing operation. Extending rearwardly from the crossed member 1 is an arm 8, said arm having pivoted thereto at 9 upwardly extending links 10 and 11. Links 10 and 11 have their upper ends pivotally connected at 12 and 13 to a rearwardly extending handle 14 which terminates in a finger receiving loop 15. It will be seen that during a movement of the handle member 14, that said handle member may have a substantially parallel movement with the rearwardly extending arm 8, the purpose of which will presently appear. Also pivotally connected at 12 to the handle member 14 is the forward end 16 of a rearwardly and upwardly extending handle member 17 which terminates in a finger receiving loop 18 for receiving one of the fingers of the operator when the operator is forcing the handle members 17 and 14 towards each other during a shearing operation. The crossed member 2 is provided with a rearwardly upwardly and downwardly extending arm 19, which arm is pivotally connected at 20 to a handle member 17, therefore it will be seen that when the handle members 14 and 17 are moved towards each other that the arms 8 and 19 will simultaneously move thereby simultaneously moving the blades 4. It will also be seen that by so positioning the various pivotal points that a leverage is provided which materially increases the shearing power and at the same time providing a leverage which when the pivotal point 12 passes upwardly through a straight line drawn between the pivotal points 3 and 20 gives an increasing power of shearing of the blades as the point of severing approaches the ends of the blades thereby insuring uniform cutting with a uniform power applied to the handle members 17 and 20. It will also be seen that the structure is positive in its operation and that the parts have been reduced to a minimum.

The invention having been set forth what is claimed as new and useful is:—

1. A pair of shears comprising crossed members, one end of said crossed members forming shearing blades, the other ends of said crossed members extending rearwardly and away from each other, one of said rearwardly extending ends having pivoted thereto at spaced points upwardly extending links, a handle member pivoted to said links, thereby forming a parallel movement, a second handle member, said second handle member having its forward end pivotally connected to the first mentioned handle member and the forward link at its upper end, said second handle member being pivotally connected to the upwardly and rearwardly extending end of the crossed member at a point spaced from the front end of the upper handle member.

2. A pair of shears comprising crossed members, the forward ends of said crossed members forming shearing blades, said crossed members being pivoted together at points intermediate their ends thereby forming rearwardly extending upper and lower arms, a rearwardly extending handle member, said handle member being pivotally connected to the lower arm through the medium of links thereby forming a parallel movement, an upper rearwardly extending handle member having its forward end pivotally connected to the lower handle member at its forward pivotal point, the rear end of the upper arm of the crossed members being pivotally connected to the upper handle member at a point spaced from its forward end.

In testimony whereof I have signed my name to this specification in the presence of two subscribing witnesses.

GEORGE W. KILLIN.

Witnesses:
FRANK McCLOUD,
FRED L. BILLMAN.